(12) United States Patent
Epp et al.

(10) Patent No.: US 6,349,812 B1
(45) Date of Patent: Feb. 26, 2002

(54) BELT DRIVE FOR A BELT CONVEYOR

(76) Inventors: Richard J. Epp; Dwayne S. Epp, both of Box 64, Fiske, Saskatchewan (CA), S0L 1C0

( * ) Notice: Subject to any disclaimer, the term of this patent is extended or adjusted under 35 U.S.C. 154(b) by 0 days.

(21) Appl. No.: 09/430,011

(22) Filed: Oct. 29, 1999

Related U.S. Application Data

(63) Continuation-in-part of application No. 09/391,666, filed on Sep. 7, 1999, now abandoned.

(51) Int. Cl.$^7$ .............................................. B65G 21/14
(52) U.S. Cl. ...................................... 198/318; 198/813
(58) Field of Search ............................... 198/300, 319, 198/318, 316.1, 813, 823, 860.3

(56) References Cited

U.S. PATENT DOCUMENTS

| | | | | |
|---|---|---|---|---|
| 3,563,364 A | * | 2/1971 | Arndt et al. ............. | 198/120.5 |
| 3,777,879 A | * | 12/1973 | Dehne ........................ | 91/411 |
| 3,944,054 A | * | 3/1976 | Ensinger ..................... | 198/118 |
| 5,131,528 A | * | 7/1992 | Bandy, Jr. .................. | 198/813 |
| 5,360,097 A | * | 11/1994 | Hibbs ......................... | 198/313 |
| 5,902,089 A | * | 5/1999 | Sinn et al. .................. | 198/313 |
| 6,186,311 B1 | * | 2/2001 | Conner ....................... | 198/300 |

* cited by examiner

Primary Examiner—Christopher P. Ellis
Assistant Examiner—Khoi H. Tran
(74) Attorney, Agent, or Firm—Adrian D. Battison

(57) ABSTRACT

The present invention is directed to a belt conveyor of the type in which a continuous belt runs along a support duct where the support duct is carried on an undercarriage for raising and lowering movements of a discharge end of the duct and where an input drive member for driving the belt is mounted at or on the undercarriage. At least one idler roller is provided to maintain a predetermined tensioning force to the belt. An accumulator is arranged to contain hydraulic fluid and to maintain the hydraulic fluid at a predetermined set pressure while allowing changes in volume of the hydraulic within the accumulator. The accumulator is connected to at least one cylinder. The cylinder is operatively connected to the idler roller for movement thereof.

19 Claims, 5 Drawing Sheets

BELT DRIVE FOR A BELT CONVEYOR

This application is a continuation in part application of application Ser. No. 09/391,666 filed Sep. 7$^{th}$ 1999 and now abandoned.

The present invention relates to a belt conveyor of the type in which a continuous belt runs along a support duct where the support duct is carried on an undercarriage for raising and lowering movements of a discharge end of the duct and where an input drive member for driving the belt is mounted at or on the undercarriage.

BACKGROUND OF THE INVENTION

Belt conveyors are well known in which the belt passes through a duct which is usually a cylindrical tube so that the belt is curved as it sits against the lower part of the tube while sliding along the tube. The return run of the belt passes on the outside of the tube and is sometimes, but not always, contained in a housing attached to the lower part of the tube and extending downwardly and outwardly therefrom. At a top end, the belt passes around an idler roller so as to discharge material at the roller where the belt turns to move along the return run. At the lower end there is provided a hopper into which material is fed so as to fall onto the belt in the hopper with the belt being guided around a lower idler roller.

Generally the belt is driven by a drive roller located at a point along its length at the return run so that the belt wraps around the drive roller as well as around one or more idler rollers to guide the belt in its movement around the drive roller.

The drive roller is located on the underside of the tube at the optional cover. The drive roller is driven generally by a belt which runs from a drive system to the drive roller.

The tube carrying the belt is supported on an undercarriage which includes a transverse axle by which the conveyor can be rolled from place to place. A first leg assembly extends from the axle upwardly and this is extendable or moveable so as to raise and lower the upper end of the tube to change the height of the discharge onto the belt. A second leg assembly extends from the axle to the tube at a position adjacent the lower end and the second leg assembly can pivot relative to the tube as the first leg assembly is operated to effect the raising and lowering movement.

The simplest undercarriage includes simply two such legs together with a single axle. However more complex undercarriages can be provided.

Generally the belt driving the drive roller passes from an input drive system on the undercarriage generally adjacent the axle. The input drive member can comprise simply a PTO input coupling for receiving drive from a tractor. However the system can include a motor so as to avoid the necessity for connection to a drive output of a tractor. The motor can be electric or an internal combustion engine or can be any other suitable source of power.

This arrangement has been utilised for many years but the drive belt to the drive roller from the power input is a source of problem in that it requires adjustment and replacement when worn.

SUMMARY OF THE INVENTION

It is an object of the invention to provide an improved belt conveyor and particularly in which the drive system to connect an input drive to the belt is improved.

According to one aspect of the invention there is provided a belt conveyor comprising:

a continuous belt having a material transportation run and a return run such that movement of the belt along its length causes the belt to move continuously through the transportation run and the return run;

a duct for supporting the transportation run of the belt, the duct having a feed end at which material to be transported is deposited onto the transportation run of the belt for movement along the belt and a discharge end at which the material transported by the belt is discharged from the belt;

the return run of the belt being guided along an underside of the duct;

an undercarriage for supporting the duct and arranged to cause raising and lowering movement of at least the discharge end of the duct;

a drive roller in contact with the belt for driving the belt along its length;

an input drive member for supplying a drive force for drivingly rotating the drive roller;

the input drive member and the drive roller being mounted on the undercarriage at respective positions thereon which remain substantially stationary as the duct is moved in said raising and lowering movement so that the input drive member remains in a fixed position as the duct is moved in said movement and so that the drive roller is fixed relative to the input drive member to receive drive therefrom without necessity for adjustment as the duct is moved;

the drive roller being spaced from the return run of the belt on the underside of the duct and the belt including a divergent portion having two runs extending from the return run to and from the drive roller to receive drive therefrom;

the undercarriage and the position of the drive roller thereon being arranged such that the length of the divergent portion remains constant as the duct is moved in said movement.

Preferably the undercarriage includes a first leg assembly which is of constant length and at a fixed position on the duct and a second leg assembly which is adjustable to cause said movement of the duct, the divergent portion of the belt extending along the first leg assembly from a guide system at an end thereof adjacent the duct to the drive roller adjacent an opposed end of the first leg assembly.

Preferably the drive roller is carried on a mounting assembly at the opposed end of the first leg assembly.

Preferably undercarriage includes an axle having ground wheels thereon the first and second leg assemblies converge to said axle.

Preferably there is provided at least one idler roller at the drive roller around which the belt passes so as to wrap the belt around the drive roller, the idler roller being adjustable in position relative to the drive roller to effect tensioning of the belt.

Preferably there are at least three idler rollers arranged to guide the belt from a first contact point on the drive roller partly around the drive roller and back to the same side of the drive roller as the first contact point.

Preferably the divergent portion is arranged on the return run at a position spaced from one end so as to define a first portion of the return run and a second portion of the return run, wherein the first leg assembly is pivotal relative to the duct about a horizontal axis at the duct transverse to the duct and wherein the divergent portion is guided at the duct by a first idler roller around which the first portion of the return run is wrapped and two second rollers which guide opposite sides of the second portion to maintain the two runs of the divergent portion spaced and substantially parallel.

Preferably the two runs of the divergent portion are contained within a cover assembly along the first leg assembly.

Preferably the input drive member comprises a PTO coupling for attachment to a PTO shaft of a drive tractor and wherein the PTO coupling is directly attached to the drive roller such that the PTO coupling is maintained at a fixed position relative to the ground as the duct is moved in said movement.

Preferably the input drive member a drive motor which has an output shaft directly connected to the drive roller without intervening drive belts.

Preferably the duct comprises a tube.

According to a second aspect of the invention there is provided a belt conveyor comprising:

a continuous belt having a material transportation run and a return run such that movement of the belt along its length causes the belt to move continuously through the transportation run and the return run;

a duct for supporting the transportation run of the belt, the duct having a feed end at which material to be transported is deposited onto the transportation run of the belt for movement along the belt and a discharge end at which the material transported by the belt is discharged from the belt;

the return run of the belt being guided along an underside of the duct;

an undercarriage for supporting the duct including:

a base assembly with ground wheels for movement of the undercarriage across the ground, a first leg assembly having one end pivotally connected to the base assembly and extending therefrom to the duct at a position adjacent to the feed end, the first leg assembly being of constant length, arranged at a fixed position on the duct and pivotally connected to the duct for pivotal movement about a horizontal axis transverse to the duct, and a second leg assembly extending from the base assembly to the duct adjacent to the discharge end and to arranged to cause raising and lowering movement of the discharge end of the duct;

a drive roller in contact with the belt for driving the belt along its length;

an input drive member for supplying a drive force for drivingly rotating the drive roller, the input drive member and the drive roller being mounted on the undercarriage at said one end of the first leg assembly;

the belt including a divergent portion having two runs extending from the return run to and from the drive roller to receive drive therefrom, the divergent portion being guided to run along the first leg assembly from the end thereof at the duct to the drive roller at said one end thereof.

According to a third aspect of the invention there is provided a belt conveyor comprising:

a continuous belt having a material transportation run and a return run such that movement of the belt along its length causes the belt to move continuously through the transportation run and the return run;

a duct for supporting the transportation run of the belt, the duct having a feed end at which material to be transported is deposited onto the transportation run of the belt for movement along the belt and a discharge end at which the material transported by the belt is discharged from the belt;

the return run of the belt being guided along an underside of the duct;

an undercarriage for supporting the duct and arranged to cause raising and lowering movement of at least the discharge end of the duct;

a drive roller in contact with the belt for driving the belt along its length;

an input drive member for supplying a drive force for drivingly rotating the drive roller;

at least one idler roller at the drive roller around which the belt passes so as to wrap the belt around the drive roller, the idler roller being adjustable in position relative to the drive roller to effect tensioning of the belt;

wherein the position of the idler roller is adjusted by a hydraulic cylinder and wherein the hydraulic cylinder is attached to an accumulator of hydraulic fluid arranged to receive a fluid at a predetermined pressure such that the idler roller is pulled in a direction to apply tension to the belt at a predetermined force thus maintaining a predetermined tension in the belt while accommodating changes in belt length.

Preferably there are at least three idler rollers arranged to guide the belt from a first contact point on the drive roller partly around the drive roller and back to the same side of the drive roller as the first contact point.

BRIEF DESCRIPTION OF THE DRAWINGS

One embodiment of the invention will now be described in conjunction with the accompanying drawings in which.

DETAILED DESCRIPTION

Figure 1:
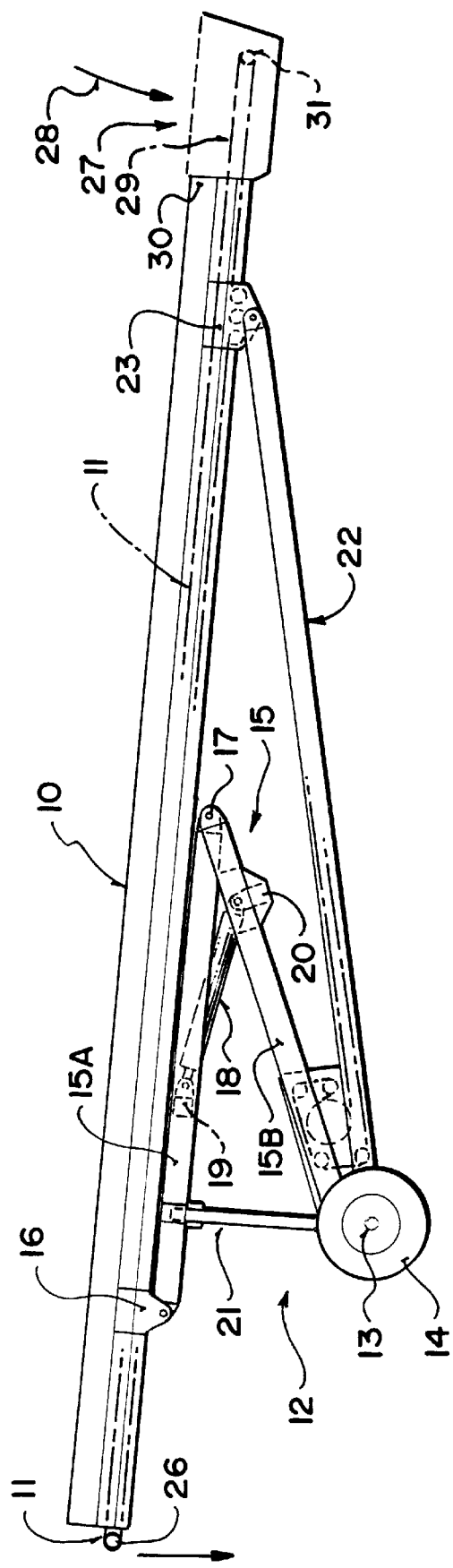
FIG. 1 is a side elevational view of a conveyor according to the present invention.

The conveyor arrangement shown in FIG. 1 comprises a duct in the form of a tube or other containment for a belt, the tube being indicated at 10 and the belt being shown at 11. An undercarriage generally indicated at 12 includes and axle 13 carrying ground wheels 14 by which the structure can be moved from place to place. A first leg assembly 15 extends from the axle to a mounting bracket 16 adjacent an upper end of the tube. The leg 15 in the example shown is foldable at a pivot junction 17 operable by a cylinder 18 connected between brackets 19 and 20 on the leg. Actuation of the cylinder thus extends the leg from a fully folded position as shown in FIG. 1 to a raised position (not shown) in which the leg is fully extended and thus two portions of the leg 15A and 15B are in line. Positions intermediate the two extreme positions provided adjustment of the height of the upper end of the tube 10. The support bracket 21 extends from the axle to a position on the upper portion 15A of the leg to hold the structure stable when in the folded position shown on FIG. 1 for transportation.

The details of the leg 15 comprises one example only and alternative arrangements for raising and lowering the upper end of the tube are well known to one skilled in the art.

Figure 5:
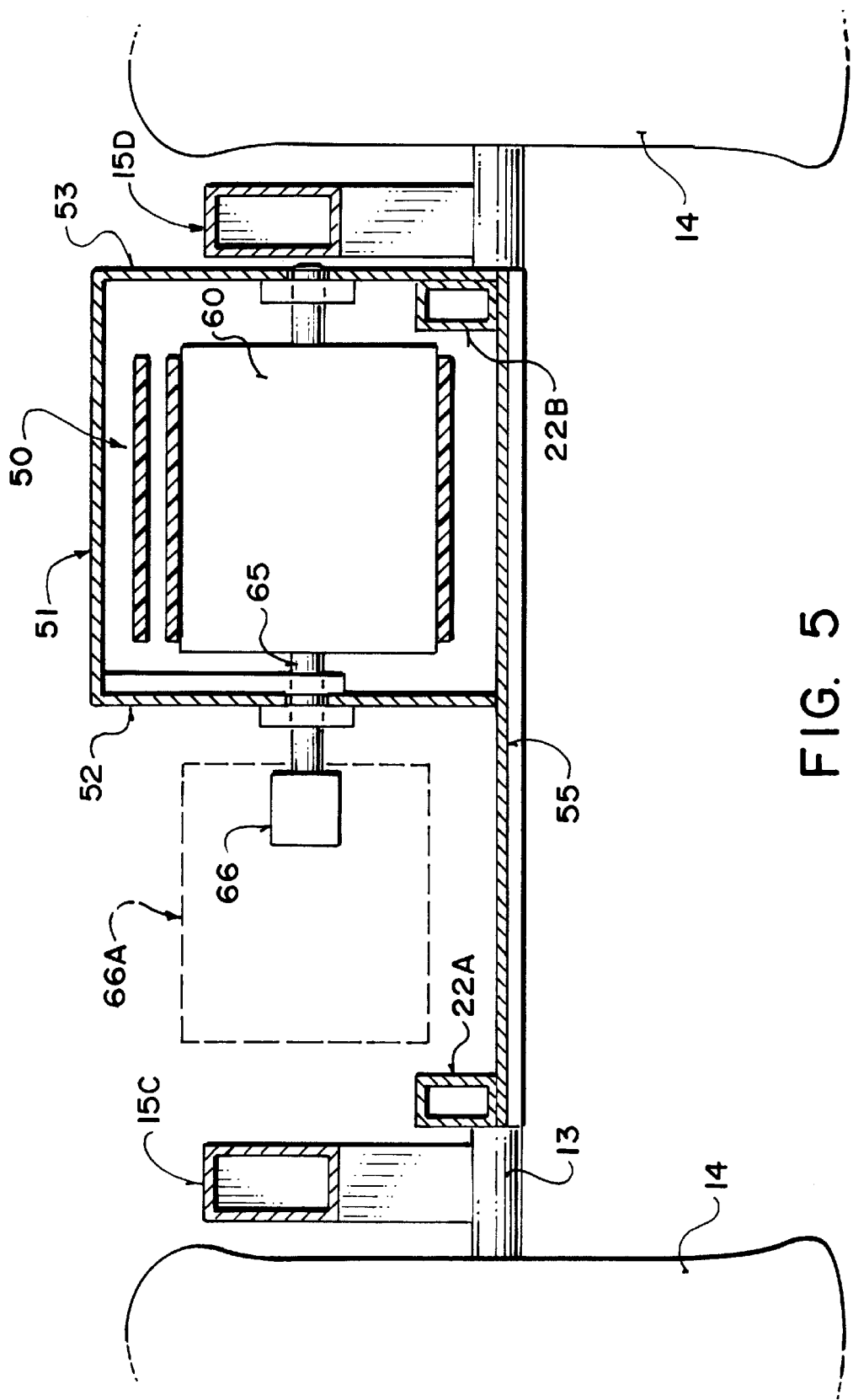
FIG. 5 is a cross-sectional view along the lines 5—5 of FIG. 2.

The leg assembly 15 is formed of two separate leg portions each at a respective end of the axle as indicated at 15C and 15D in FIG. 5. The leg portions thus together define the leg assembly which converges from a wider width at the axle to a narrower width at the bracket 16 so as to support the tube centrally over the axle 13.

A second leg assembly 22 is of a constant or fixed length extending from the axle 13 to a bracket 23 on the tube adjacent the lower end of the tube. Again the leg assembly 22 is formed of two leg portions 22A and 22B spaced apart at the axle and converging inwardly towards one another at the bracket 23. The leg portions are pivotally mounted at the axle 13 and are also pivotally connected to the bracket 23 at the tube. As the leg 15 is thus actuated to raise and lower the tube, the second leg assembly 22 pivots relative to the tube and to the axle to accommodate the changes in angle of the tube.

At the upper end of the tube is provided an idler roller 26 around which the belt turns from its drive length or run 11A within the tube to its return run 11B underneath the tube.

At the bottom end is provided a hopper 27 which is attached to the lower end of the tube and confines material fed into the hopper as indicated at 28 so as to fall onto an exposed lower end portion of the belt which extends beyond the lower end 30 of the tube. The exposed portion of the belt passes around an idler roller 31 so that the drive portion 11A of the belt lies upwardly within the hopper to receive the material and the return rub 11B passes underneath the idler roller and back along the underside of the tube.

Figure 4:
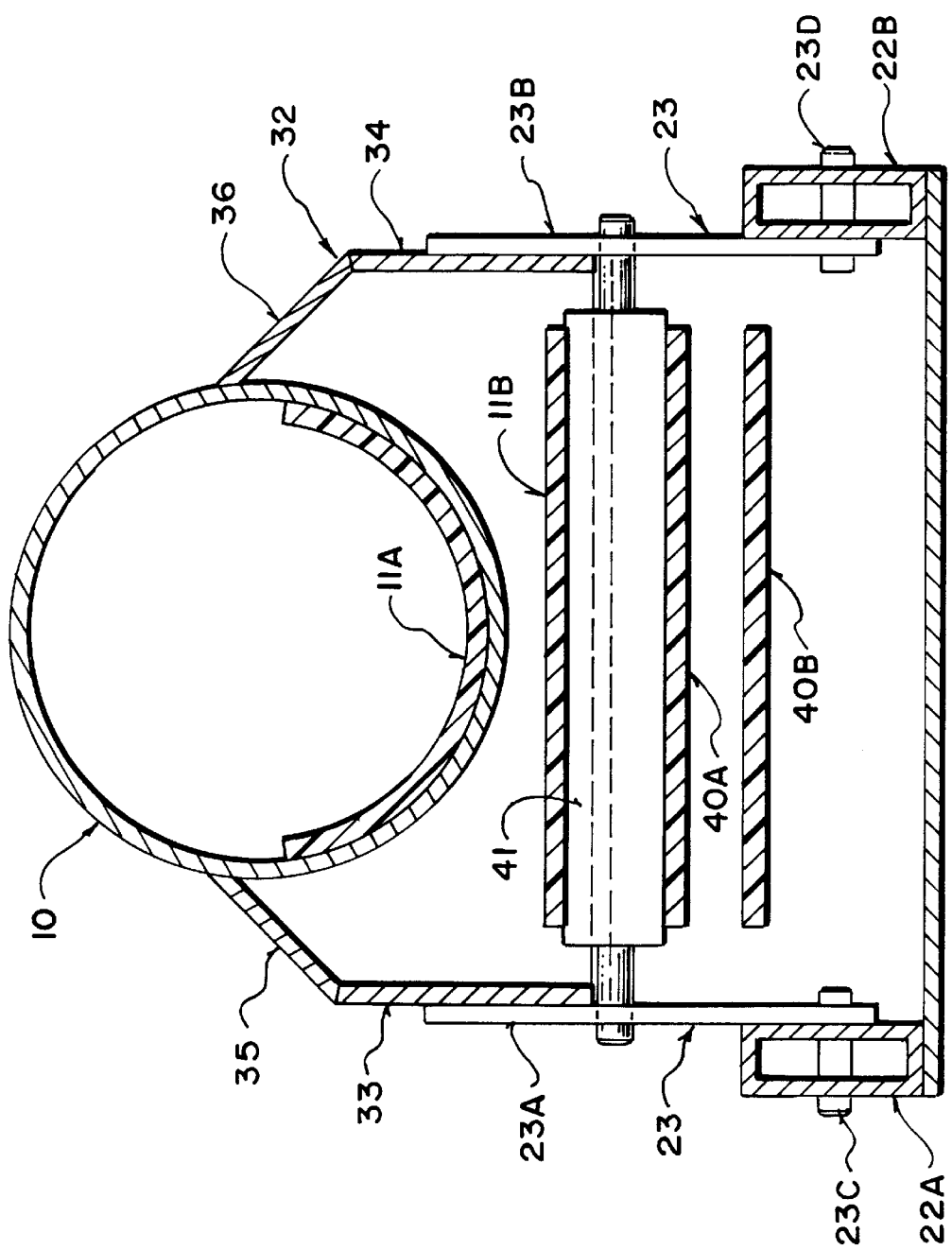
FIG. 4 is a cross-sectional view along the lines 4—4 of FIG. 3.

In many cases the return length of the belt is exposed on the outside of the tube. In the embodiment shown, however, the return length 11B is contained within a cover 32 attached to the underside of the tube 10. Thus as shown in FIG. 4, the drive run 11A of the belt sits on the inside surface of the tube 10 at the bottom of the tube. The cover 32 comprises two side walls 33 and 34 which extend vertically downwardly together with sloped side walls 35 and 36 which are attached to the tube at the upper inner end and extend therefrom downwardly and outwardly to the top of the vertical side walls 33 and 34. A bottom wall closes the cover and contains the belt.

Figure 3:
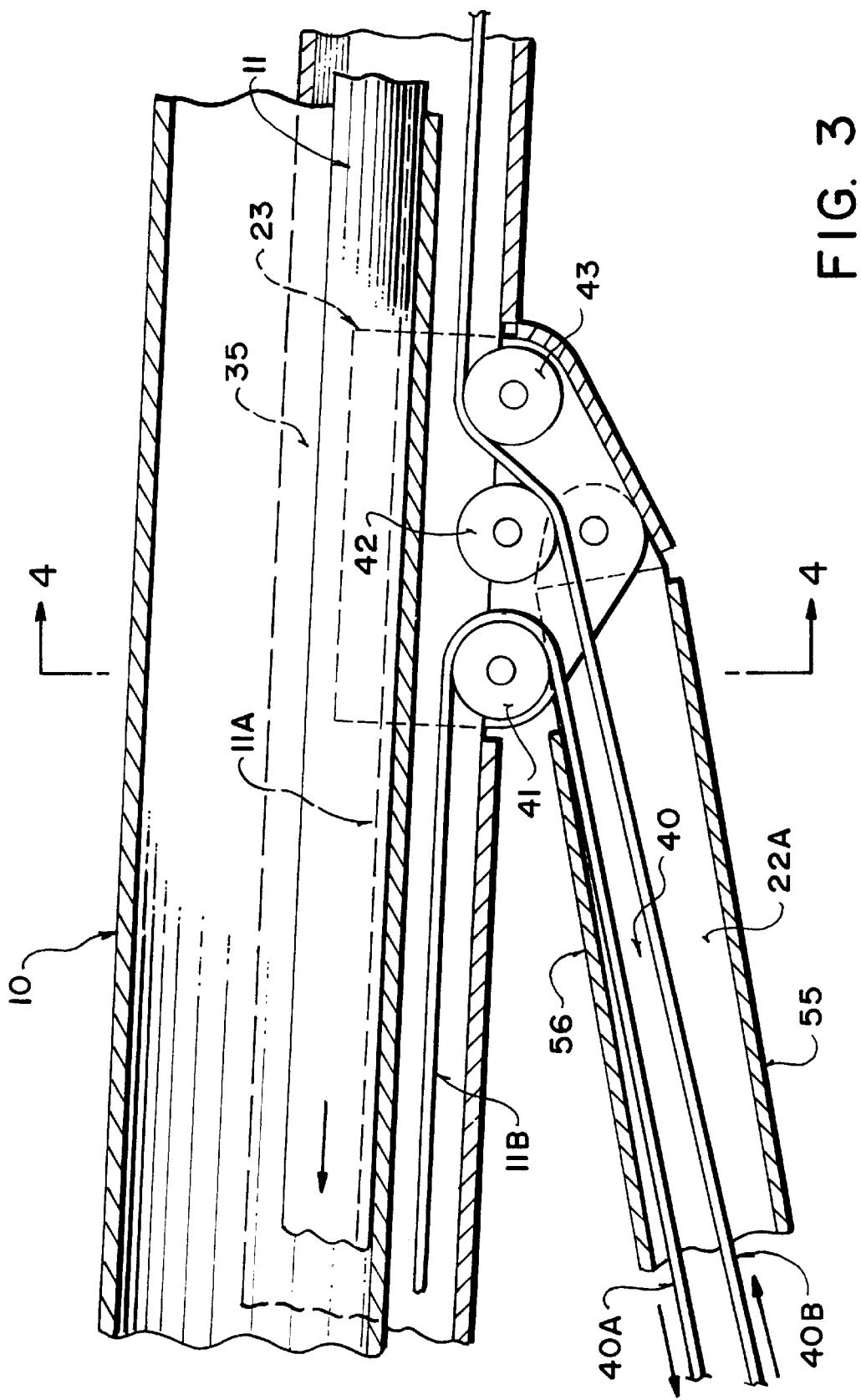
FIG. 3 is a vertical cross-sectional view of the conveyor of FIG. 1 showing on an enlarged scale the belt guide arrangement at the top of the leg assembly.

As shown in FIG. 3, the belt includes a divergent portion which extends in a loop from the return run 11B. The divergent loop 40 includes an upper run 40A and a lower run 40B. The divergent run or loop is guided at its upper end by three rollers 41, 42 and 43 at the bracket 23.

The bracket 23 includes two depending side walls 23A and 23B on which the legs 22A and 22B of the second leg assembly are pivoted by respective mounting pins 23C and 23D. The depending side walls 23A and 23B also mount suitable support bearings for the rollers 41, 42 and 43. The upper run of the divergent loop 40 wraps around the roller 41 so as to pass underneath that roller and then along between the leg portions 22A and 22B. The lower run 40B of the divergent loop 40 passes underneath the roller 42 and on top of the roller 43. Thus rollers 41 and 43 guide the return run 11B of the belt along the underside of the tube. The roller 42 guides the divergent loop 40 from the return run to hold the upper run 40A spaced away from the lower run 40B. The roller 42 further guides the lower run 40B while accommodating the changes in angle of the leg assembly 22 relative to the bracket 23 by pivotal movement about the pins 23C and 23D.

Figure 2:
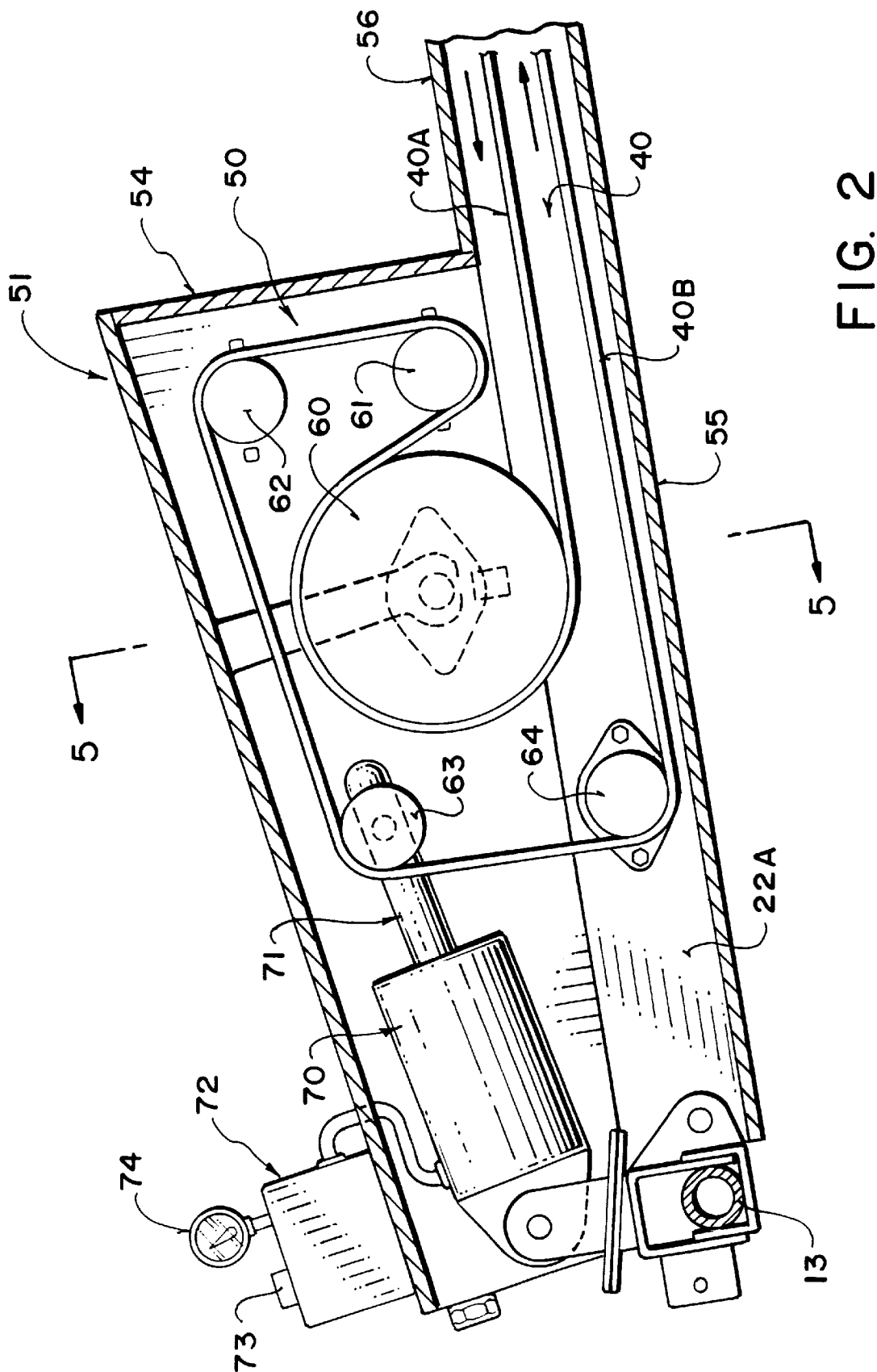
FIG. 2 is a vertical cross-sectional view of the conveyor of FIG. 1 showing on an enlarged scale the belt drive arrangement at the base of the leg assembly.

At the lower end of the legs 22A and 22B, as best shown in FIGS. 2 and 5, there is provided a belt drive system generally indicated at 50. The belt drive system is mounted in a housing 51 mounted on the second leg assembly 22. The housing 51 includes a pair of upstanding side plates 52 and 53 each on a respective side of the belt. The side plate 53 is attached to the outside vertical surface of the leg portion 22B. The side wall 52 is spaced to one side of the side wall 53 by a distance sufficient to receive the belt therebetween. The side walls 52 and 53 extend to a front plate 54. The side plates extends down to the axle 13. A bottom plate 55 extends across underneath the bottom of the leg portions 22A and 22B and is attached thereto. A top 56 extends from the top surface of the leg portions 22A an 22B and thus bridges the top of the loop 40 which is located between the leg portions 22A and 22B. The top plate 56 may extend across the full width of the area between the legs or may bridge only the area containing the belt. It will be appreciated that as the legs increase in width from the top at the tube to the axle, the width of the belt completely fills the area between the legs at the top but is relatively narrow in comparison with the space in between the legs at the bottom.

At the bottom end of the legs within the housing 51, the drive system 50 comprises a main drive roller 60 and a plurality of idler rollers 61, 62, 63 and 64. It is most convenient to provide four such idler rollers as shown so as to provide effective driving for the belt while wrapping the belt around the majority of the peripheral surface of the main drive roller 60. The idler rollers and the main drive roller are carried on suitable bearings attached to the side walls 52 and 53.

The main drive roller 60 has a drive shaft 65 which projects through the side wall 52. In one embodiment the shaft carries a conventional PTO coupling 66 which is thus fixed to the side wall 52 and substantially at a fixed position relative to the axle 13. The PTO coupling is therefore substantially stationary even as the tube 10 is raised and lowered between the extreme positions. The stationary position is obtained since the distance between the shaft 65 and the axle 13 is relatively small, the leg assembly 22 is relatively long and the amount of movement of the bracket 23 is relatively small.

In an alternative arrangement shown in dashed line, the PTO coupling 66 is replaced by a drive motor 66A of any conventional type. Thus the drive motor can include an electric motor suitably carried at the housing 51 or can comprise an internal combustion engine again mounted on the leg assembly at the lower end.

The four idler rollers 61, 62, 63 and 64 guide the belt from the lower run 40B under the idler 64, over the idler 63, over the idler 62, under the idler 61 and onto the top of the roller 60. From the bottom of the roller 60, the upper run 40A extends along the leg assembly back to the top. One of the idlers, in this arrangement the idler 63, is adjustable by a adjustment device 70 so as to move the position of the idler relative to the other three idlers and the main drive roller to effect tensioning of the complete belt length. Thus the only adjustment for the tensioning of the belt is provided at the idler 63 which is located conveniently at the bottom of the leg assembly 22 within the housing 51.

In one example (not shown) the adjustment device comprises a simple screw tensioner which can be adjusted to apply the required tensioning force.

In FIG. 2, the idler roller 63 is attached to the piston rod 71 of a hydraulic cylinder 70 arranged so that the piston applies a pulling force on the roller 63 in a direction to apply a tensioning force to the belt. Thus the position of the idler roller 63 is adjusted by the hydraulic cylinder 70. The hydraulic cylinder is attached to an accumulator 72 of hydraulic fluid arranged through a port 73 to receive a fluid at a predetermined pressure indicated by a gauge 74. The accumulator is of a type which is commercially available and well known to one skilled in the art and includes a bladder set at the predetermined pressure while allowing changes in fluid volume within the accumulator to be accommodated such that the idler roller is pulled in a direction to apply tension to the belt at a predetermined force thus maintaining a predetermined tension in the belt while accommodating changes in belt length at that predetermined tension by movement of the cylinder. Such changes in belt length can be caused by material collecting under the belt on the rollers, by changes in temperature and by changes in loading on the belt and all of these changes can be automatically accommodated by the cylinder without manual adjustment.

Thus the main belt of the conveyor is directly driven by the drive system at the bottom of the second leg assembly so that direct driving of the belt is convenient for direct connection to a motor or to a PTO shaft as previously described. There is no necessity for extra drive belts which can stretch and wear.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A belt conveyor comprising:
   a continuous belt having a material transportation run and a return run such that movement of the belt along its length causes the belt to move continuously through the transportation run and the return run;
   a duct for supporting the transportation run of the belt, the duct having a feed end at which material to be transported is deposited onto the transportation run of the belt for movement along the belt and a discharge end at which the material transported by the belt is discharged from the belt;
   the return run of the belt being guided along an underside of the duct;
   an undercarriage for supporting the duct and arranged to cause raising and lowering movement of at least the discharge end of the duct;
   a drive roller in contact with the belt for driving the belt along its length;
   an input drive member for supplying a drive force for drivingly rotating the drive roller;
   the input drive member and the drive roller being mounted on the undercarriage at respective positions thereon which remain substantially stationary as the duct is moved in said raising and lowering movement so that the input drive member remains in a fixed position as the duct is moved in said movement and so that the drive roller is fixed relative to the input drive member to receive drive therefrom without necessity for adjustment as the duct is moved;
   the drive roller being spaced from the return run of the belt on the underside of the duct and the belt including a divergent portion having two runs extending from the return run to and from the drive roller to receive drive therefrom;
   the undercarriage and the position of the drive roller thereon being arranged such that the length of the divergent portion remains constant as the duct is moved in said movement.

2. The belt conveyor according to claim 1 wherein the undercarriage includes a first leg assembly which is of constant length and at a fixed position on the duct and a second leg assembly which is adjustable to cause said movement of the duct, the divergent portion of the belt extending along the first leg assembly from a guide system at an end thereof adjacent the duct to the drive roller adjacent an opposed end of the first leg assembly.

3. The belt conveyor according to claim 2 wherein the drive roller is carried on a mounting assembly at the opposed end of the first leg assembly.

4. The belt conveyor according to claim 2 wherein undercarriage includes an axle having ground wheels thereon the first and second leg assemblies converge to said axle.

5. The belt conveyor according to claim 1 wherein there is provided at least one idler roller at the drive roller around which the belt passes so as to wrap the belt around the drive roller, the idler roller being adjustable in position relative to the drive roller to effect tensioning of the belt.

6. The belt conveyor according to claim 5 wherein there are at least three idler rollers arranged to guide the belt from a first contact point on the drive roller partly around the drive roller and back to the same side of the drive roller as the first contact point.

7. The belt conveyor according to claim 5
   wherein the position of the idler roller is adjusted by changes in length of at least one hydraulic cylinder;
   wherein there is provided an accumulator arranged to contain hydraulic fluid and to maintain the hydraulic fluid at a predetermined set pressure while allowing changes in volume of the hydraulic fluid within the accumulator;
   and wherein the accumulator is connected to the at least one cylinder by a connection which provides for direct communication of the hydraulic fluid in both directions between the at least one cylinder and the accumulator so that the accumulator receives from and supplies hydraulic fluid to the at least one hydraulic cylinder to maintain a constant set pressure within the at least one cylinder while accommodating the changes in length of the at least one cylinder;

such that the idler roller is pulled in a direction to apply tension to the belt at a predetermined force thus maintaining a predetermined tension in the belt while accommodating changes in belt length.

8. The belt conveyor according to claim 2 wherein the divergent portion is arranged on the return run at a position spaced from one end so as to define a first portion of the return run and a second portion of the return run, wherein the first leg assembly is pivotal relative to the duct about a horizontal axis at the duct transverse to the duct and wherein the divergent portion is guided at the duct by a first idler roller around which the first portion of the return run is wrapped and two second rollers which guide opposite sides of the second portion to maintain the two runs of the divergent portion spaced and substantially parallel.

9. The belt conveyor according to claim 2 wherein the two runs of the divergent portion are contained within a cover assembly along the first leg assembly.

10. The belt conveyor according to claim 1 wherein the input drive member comprises a PTO coupling for attachment to a PTO shaft of a drive tractor and wherein the PTO coupling is directly attached to the drive roller such that the PTO coupling is maintained at a fixed position relative to the ground as the duct is moved in said movement.

11. The belt conveyor according to claim 1 wherein the input drive member a drive motor which has an output shaft directly connected to the drive roller without intervening drive belts.

12. The belt conveyor according to claim 1 wherein the duct comprises a tube.

13. A belt conveyor comprising:

a continuous belt having a material transportation run and a return run such that movement of the belt along its length causes the belt to move continuously through the transportation run and the return run;

a duct for supporting the transportation run of the belt, the duct having a feed end at which material to be transported is deposited onto the transportation run of the belt for movement along the belt and a discharge end at which the material transported by the belt is discharged from the belt;

the return run of the belt being guided along an underside of the duct;

an undercarriage for supporting the duct including:

a base assembly with ground wheels for movement of the undercarriage across the ground, a first leg assembly having one end pivotally connected to the base assembly and extending therefrom to the duct at a position adjacent to the feed end, the first leg assembly being of constant length, arranged at a fixed position on the duct and pivotally connected to the duct for pivotal movement about a horizontal axis transverse to the duct, and a second leg assembly extending from the base assembly to the duct adjacent to the discharge end and to arranged to cause raising and lowering movement of the discharge end of the duct;

a drive roller in contact with the belt for driving the belt along its length;

an input drive member for supplying a drive force for drivingly rotating the drive roller, the input drive member and the drive roller being mounted on the undercarriage at said one end of the first leg assembly;

the belt including a divergent portion having two runs extending from the return run to and from the drive roller to receive drive therefrom, the divergent portion being guided to run along the first leg assembly from the end thereof at the duct to the drive roller at said one end thereof.

14. The belt conveyor according to claim 13 wherein the drive roller is carried on a mounting assembly carried on the first leg assembly.

15. The belt conveyor according to claim 13 wherein the base assembly comprises an axle having the ground wheels thereon with the first and second leg assemblies converging to said axle.

16. The belt conveyor according to claim 13 wherein there is provided at least one idler roller at the drive roller around which the belt passes so as to wrap the belt around the drive roller, the idler roller being adjustable in position relative to the drive roller to effect tensioning of the belt.

17. The belt conveyor according to claim 13 wherein the divergent portion is arranged on the return run at a position spaced from one end so as to define a first portion of the return run and a second portion of the return run, and wherein the divergent portion is guided at the duct by a first idler roller around which the first portion of the return run is wrapped and two second rollers which guide opposite sides of the second portion to maintain the two runs of the divergent portion spaced and substantially parallel.

18. The belt conveyor according to claim 13 wherein the position of the idler roller is adjusted by changes in length of at least one hydraulic cylinder;

wherein there is provided an accumulator arranged to contain hydraulic fluid and to maintain the hydraulic fluid at a predetermined set pressure while allowing changes in volume of the hydraulic fluid within the accumulator;

and wherein the accumulator is connected to the at least one cylinder by a connection which provides for direct communication of the hydraulic fluid in both directions between the at least one cylinder and the accumulator so that the accumulator receives from and supplies hydraulic fluid to the at least one hydraulic cylinder to maintain a constant set pressure within the at least one cylinder while accommodating the changes in length of the at least one cylinder;

such that the idler roller is pulled in a direction to apply tension to the belt at a predetermined force thus maintaining a predetermined tension in the belt while accommodating changes in belt length.

19. A belt conveyor comprising:

a continuous belt having a material transportation run and a return run such that movement of the belt along its length causes the belt to move continuously through the transportation run and the return run;

a duct for supporting the transportation run of the belt, the duct having a feed end at which material to be transported is deposited onto the transportation run of the belt for movement along the belt and a discharge end at which the material transported by the belt is discharged from the belt;

the return run of the belt being guided along an underside of the duct;

an undercarriage for supporting the duct and arranged to cause raising and lowering movement of at least the discharge end of the duct;

a drive roller in contact with the belt for driving the belt along its length;

an input drive member for supplying a drive force for drivingly rotating the drive roller;

at least one idler roller at the drive roller around which the belt passes so as to wrap the belt around the drive roller, the idler roller being adjustable in position relative to the drive roller to effect tensioning of the belt;

wherein the position of the idler roller is adjusted by changes in length of at least one hydraulic cylinder;

wherein there is provided an accumulator arranged to contain hydraulic fluid and to maintain the hydraulic fluid at a predetermined set pressure while allowing changes in volume of the hydraulic fluid within the accumulator;

and wherein the accumulator is connected to the at least one cylinder by a connection which provides for direct communication of the hydraulic fluid in both directions between the at least one cylinder and the accumulator so that the accumulator receives from and supplies hydraulic fluid to the at least one hydraulic cylinder to maintain a constant set pressure within the at least one cylinder while accommodating the changes in length of the at least one cylinder; such that the idler roller is pulled in a direction to apply tension to the belt at a predetermined force thus maintaining a predetermined tension in the belt while accommodating changes in belt length.

\* \* \* \* \*